(12) United States Patent
Jayachandran et al.

(10) Patent No.: US 8,186,146 B2
(45) Date of Patent: May 29, 2012

(54) AFTER-TREATMENT COMPONENT DETECTION SYSTEM

(75) Inventors: Amit Jayachandran, Peoria, IL (US); Mary Lou Kesse, Hanna City, IL (US)

(73) Assignee: Caterpillar Inc., Peoria, IL (US)

( * ) Notice: Subject to any disclaimer, the term of this patent is extended or adjusted under 35 U.S.C. 154(b) by 774 days.

(21) Appl. No.: 12/230,326

(22) Filed: Aug. 27, 2008

(65) Prior Publication Data

US 2010/0050608 A1 Mar. 4, 2010

(51) Int. Cl.
*F01N 3/00* (2006.01)
(52) U.S. Cl. .............. 60/277; 60/274; 60/286; 60/297; 60/311
(58) Field of Classification Search .............. 60/274, 60/277, 285–287, 295–301
See application file for complete search history.

(56) References Cited

U.S. PATENT DOCUMENTS

| | | | |
|---|---|---|---|
| 3,882,451 A | 5/1975 | Fujishiro et al. | |
| 5,177,463 A | 1/1993 | Bradshaw et al. | |
| 5,253,475 A | 10/1993 | Kabasin | |
| 5,428,956 A | 7/1995 | Maus et al. | |
| 5,600,948 A | 2/1997 | Nakajima et al. | |
| 6,145,302 A | 11/2000 | Zhang et al. | |
| 6,202,406 B1 | 3/2001 | Griffin et al. | |
| 6,276,128 B1 | 8/2001 | Kammann et al. | |
| 6,952,920 B2 | 10/2005 | Shirakawa | |
| 7,048,891 B2 * | 5/2006 | Kinugawa et al. | 422/94 |
| 7,263,434 B2 * | 8/2007 | Ripper et al. | 701/114 |
| 7,356,988 B2 | 4/2008 | Pott et al. | |
| 2006/0089783 A1 * | 4/2006 | Braun | 701/114 |
| 2007/0144146 A1 * | 6/2007 | Kusatsugu | 60/277 |
| 2007/0233326 A1 | 10/2007 | Jayachandran | |
| 2008/0041035 A1 * | 2/2008 | Sawada et al. | 60/277 |

OTHER PUBLICATIONS

Nebergall et al. (Cummins Inc.), "Selective Catalytic Reduction On-Board Diagnostics: Past and Future Challenges," 2005-01-3603, SAE International, Commercial Vehicle Engineering Congress and Exhibition, Chicago, IL, Nov. 1-3, 2005.

* cited by examiner

*Primary Examiner* — Thomas Denion
*Assistant Examiner* — Jesse Bogue
(74) *Attorney, Agent, or Firm* — Finnegan, Henderson, Farabow, Garrett & Dunner LLP (57) ABSTRACT

An after-treatment component detection system may include an exhaust system configured to include an after-treatment component configured to remove one or more constituents of the exhaust gases. The detection system may include an upstream temperature sensor configured to measure temperature upstream from the after-treatment component, a downstream temperature sensor configured to measure temperature downstream from the after-treatment component, and a controller. The controller may be configured to receive signals indicative of upstream temperature measurements from the upstream sensor and signals indicative of downstream temperature measurements from the downstream sensor and determine an upstream rate of temperature change and a downstream rate of temperature change. The controller may also be configured to compare the upstream rate of temperature change to the downstream rate of temperature change and generate a fault if the upstream rate of temperature change and the downstream rate of temperature change differ by less than a predetermined amount.

24 Claims, 3 Drawing Sheets

AFTER-TREATMENT COMPONENT DETECTION SYSTEM

TECHNICAL FIELD

The present disclosure is directed to an after-treatment component detection system and, more particularly, to an after-treatment component detection system configured to determine whether a catalyst is present in the system.

BACKGROUND

Engines, including diesel engines, gasoline engines, natural gas engines, and other engines known in the art, may exhaust a complex mixture of air pollutants. The air pollutants may be gaseous (e.g., CO, $NO_x$, etc.) and may also include solid material, such as particulate matter. Particulate matter may include ash and unburned carbon particles and may sometimes be referred to as soot.

Due to increased environmental concerns, exhaust emission standards have become more stringent. The amount of particulate matter and gaseous pollutants emitted from an engine may be regulated according to the type, size, and/or class of engine. In order to meet these emissions standards, engine manufacturers have pursued improvements in several different engine technologies, such as fuel injection, engine management, and air induction. In addition, engine manufacturers have developed devices and systems for treatment of engine exhaust after it leaves the engine.

Such systems are often referred to as "after-treatment" systems. After-treatment systems may include after-treatment components, such as catalytic converters and particulate traps. For various reasons, owners and/or operators of engine-operated equipment having after-treatment components sometimes remove or bypass the after-treatment components. This however, can result in the equipment producing more exhaust pollutants than it was designed to and/or producing more pollutants than allowed by government emissions regulations.

The Environmental Protection Agency ("EPA") has mandated that operators of on-highway vehicles must be notified when certain emissions requirements are not met during normal operation of their vehicle. Accordingly, in order to help ensure compliance with emissions regulations such as this and other mandates, it may be advantageous to provide engines with an after-treatment systems with the capability of detecting the presence of after-treatment components and generating a fault if a monitored component is determined to be missing from the system. Moreover, having an on-board diagnostics system may be advantageous for identifying issues early on and hence prevent further costly repairs at a later stage. Systems have been contemplated with such a capability. For example, in SAE technical paper no. 2005-01-3603 entitled *Selective Catalytic Reduction On-Board Diagnostics: Past and Future Challenges*, Nebergall et al. describe a concept of monitoring for a missing selective catalytic reduction (SCR) catalyst by determining an absolute difference between temperatures upstream of the SCR catalyst and temperatures downstream of the SCR catalyst. There are, however, many operating conditions where upstream temperature and downstream temperature are substantially the same. Nebergall et al. do not disclose any additional conditions for generating a fault indicative of a missing SCR catalyst. Such unrestricted monitoring for temperature differences can produce false positives (i.e., faults generated even though the SCR catalyst is, in fact, present).

The present disclosure is directed at improvements in detecting after-treatment components.

SUMMARY

In one aspect, the present disclosure is directed to an after-treatment component detection system. The detection system may include an exhaust system configured to carry exhaust gases produced by a combustion engine away from the engine and configured to include an after-treatment component configured to remove one or more constituents of the exhaust gases. The detection system may also include an upstream temperature sensor configured to measure temperature upstream from the after-treatment component, a downstream temperature sensor configured to measure temperature downstream from the after-treatment component, and a controller. The controller may be configured to receive signals indicative of upstream temperature measurements from the upstream temperature sensor and signals indicative of downstream temperature measurements from the downstream temperature sensor and determine, from the received signals, an upstream rate of temperature change and a downstream rate of temperature change. The controller may be also be configured to compare the upstream rate of temperature change to the downstream rate of temperature change and generate a fault if the upstream rate of temperature change and the downstream rate of temperature change differ by less than a predetermined amount.

In another aspect, the present disclosure is directed to an after-treatment component detection system, which may include an exhaust system configured to carry exhaust gases produced by a combustion engine away from the engine and configured to include an after-treatment component to remove one or more constituents of the exhaust gases. The detection system may also include an upstream temperature sensor configured to measure temperature upstream from the after-treatment component, a downstream temperature sensor configured to measure temperature downstream from the after-treatment component, and a controller. The controller may be configured to receive signals indicative of upstream temperature measurements from the upstream temperature sensor and signals indicative of downstream temperature measurements from the downstream temperature sensor and determine upstream absolute rates of temperature change and downstream absolute rates of temperature change. The controller may also be configured to integrate the upstream rates of temperature change over a period of time, and integrate the downstream rates of temperature change over substantially the same period of time. In addition, the controller may be configured to compare the integrated upstream rates of temperature change with the integrated downstream rates of temperature change and generate a fault if the integrated upstream rates of temperature change and the integrated downstream rates of temperature change differ by less than a predetermined amount.

In another aspect, the present disclosure is directed to a method of detecting the presence of an exhaust after-treatment component. The method may include taking upstream temperature measurements in an exhaust system configured to carry exhaust gases produced by a combustion engine, the upstream temperature measurements being taken at a first location upstream from a portion of the exhaust system configured to include an after-treatment component. The method may also include taking downstream temperature measurements at a second location downstream from the portion of the exhaust system configured to include the after-treatment component, receiving signals indicative of the upstream temperature measurements with a controller, and receiving signals indicative of the downstream temperature measurements with the controller. The method may further include determining, from the received signals, an upstream rate of temperature change and a downstream rate of temperature change. In addition, the method may include comparing the upstream rate of temperature change to the downstream rate of temperature change and generating a fault if the upstream rate of temperature change and the downstream rate of temperature change differ by less than a predetermined amount.

In another aspect, the present disclosure is directed to a method of detecting the presence of an exhaust after-treatment component, wherein the method may include taking upstream temperature measurements in an exhaust system configured to carry exhaust gases produced by a combustion engine, the upstream temperature measurements being taken at a first location upstream from a portion of the exhaust system configured to include an after-treatment component, and taking downstream temperature measurements at a second location downstream from the portion of the exhaust system configured to include the after-treatment component. The method may also include receiving signals indicative of the upstream and downstream temperature measurements at a controller and determining upstream absolute rates of temperature change and downstream absolute rates of temperature change. In addition, the method may include integrating the upstream rates of temperature change over a period of time and integrating the downstream rates of temperature change over substantially the same period of time. Further, the method may include comparing the integrated upstream rates of temperature change with the integrated downstream rates of temperature change and generating a fault if the integrated upstream rates of temperature change and the integrated downstream rates of temperature change differ by less than a predetermined amount.

DETAILED DESCRIPTION

Reference will now be made in detail to the drawings. Wherever possible, the same reference numbers will be used throughout the drawings to refer to the same or like parts.

Figure 1:
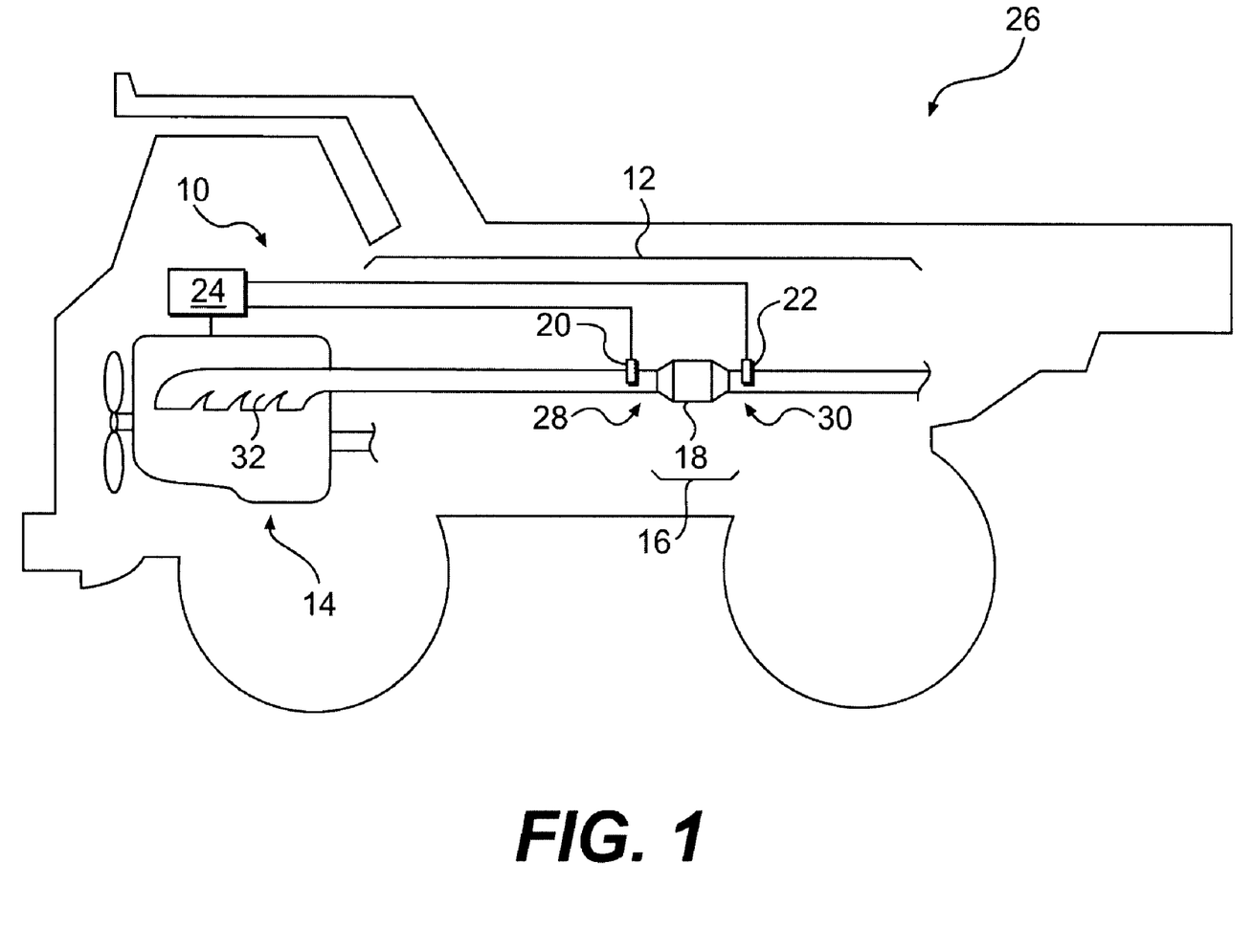
FIG. 1 is a diagrammatic illustration of an after-treatment component detection system according to an exemplary disclosed embodiment.

FIG. 1 shows an after-treatment component detection system 10. Detection system 10 may include an exhaust system 12 configured to carry exhaust gases produced by a combustion engine 14 away from engine 14. A portion 16 of exhaust system 12 may be configured to include an after-treatment component 18 configured to remove one or more constituents of the exhaust gases. Detection system 10 may also include an upstream temperature sensor 20, a downstream temperature sensor 22, and a controller 24.

Engine 14 may be any type of exhaust-producing internal combustion engine and may be configured to power a machine 26. Although machine 26 is shown as a truck in FIG. 1, machine 26 could be any type of machine having an exhaust-producing engine. Machine 26 could be a stationary machine, such as an electric power generation set. Alternatively, machine 26 may be a mobile machine, such as a piece of construction equipment (e.g., excavator, bulldozer, etc.), an on-road or off-road vehicle (e.g. a dump truck as shown in FIG. 1, a passenger car, semi-trailer truck, bus, etc.), a locomotive, or a marine vessel.

Engine 14 may be any kind of engine that produces an exhaust flow of exhaust gases. For example, engine 14 may be an internal combustion engine, such as a gasoline engine, a diesel engine, a gaseous fuel burning engine or any other exhaust gas-producing engine.

After-treatment component 18 may be any type of device having a thermal mass, and configured to remove one or more constituents from the exhaust flow of engine 14. After-treatment component 18 may include any suitable material, such as metals, ceramics, etc. In some embodiments, after-treatment component 18 may include a catalyst-based device, such as a catalytic converter. For example, after-treatment component 18 may include a reduction catalyst, such as a selective catalytic reduction (SCR) catalyst. Alternatively or additionally, after-treatment component 18 may include an oxidation catalyst, such as a diesel oxidation catalyst (DOC). Catalysts may be disposed on, and/or in, substrates of any suitable material, such as porous ceramic or metal substrates.

In other embodiments, after-treatment component 18 may include a particulate trap. Exemplary particulate traps may be configured to remove one or more types of particulate matter from the exhaust gases produced by engine 14. Such particulate traps may include a filter medium (e.g., a porous ceramic material, such as cordierite) configured to remove (i.e., trap) one or more types of particulate matter from the exhaust flow of engine 14.

Although after-treatment component 18 is discussed herein primarily as being a catalyst-based device or particulate trap, in some embodiments, after-treatment component 18 may include multifunctional devices such as a combination of a catalytic converter and a particulate trap in the same unit or a catalytic particulate trap, which may include a filter medium formed of a catalytic material or having a catalytic coating.

Upstream temperature sensor 20 may be configured to measure a temperature at an upstream end of after-treatment component 18. For example, upstream temperature sensor 20 may be configured to measure temperature (e.g., of the exhaust gases and/or of after-treatment component 18) at or just upstream from an inlet 28 of after-treatment component 18. In order to detect whether at least part of after-treatment component 18 is missing, upstream temperature sensor 20 may be located upstream from portion 16 of exhaust system 12 where after-treatment component 18 would normally be disposed. With this configuration, upstream temperature sensor 20 would remain in place and functional even if after-treatment component 18 were removed from exhaust system 12.

Downstream temperature sensor 22 may be configured to measure a temperature at a downstream end of after-treatment component 18. For example, downstream temperature sensor 22 may be configured to measure temperature (e.g., of the exhaust gases and/or of after-treatment component 18) at or just downstream from an outlet 30 of after-treatment component 18. Downstream temperature sensor 22 may be located downstream from portion 16 of exhaust system 12 in order to remain functional in the event after-treatment component 18 is removed from exhaust system 12.

Temperature sensors 20 and 22 may be any type of temperature sensors suitable for detecting temperature in the appropriate temperature range and environment (e.g., in the exhaust stream in some embodiments). For example, temperature sensors 20 and 22 may include thermistors or other temperature measuring components, such as infrared temperature sensors. In some embodiments, temperature sensors 20 and 22 may include infrared temperature sensors located upstream and downstream of after-treatment component, respectively, and may be configured to detect a temperature of the respective upstream and downstream ends of after-treatment component.

In some embodiments, either or both of temperature sensors 20 and 22 may be "virtual" sensors. To provide "virtual" upstream temperature measurements, controller 24 may be configured to determine the upstream temperature based on other parameters measured by detection system 10 and/or based on temperatures measured remote from portion 16 in exhaust system 12. For example, upstream temperature may be determined based on a temperature measurement taken further upstream, such as in an exhaust manifold 32. Alternatively, upstream temperature may be calculated based on other engine operating parameters, such as engine speed, engine load, ambient (i.e., atmospheric) temperatures, etc. From parameters such as these, exhaust temperatures may be determined or estimated. Actual measurements may be taken during engine testing from which a lookup table may be generated. During operation of engine 14, controller 24 may refer to the lookup table to determine exhaust temperature based on current engine operating parameters.

In some embodiments, controller 24 may be configured to calculate a virtual downstream temperature measurement based on temperatures and/or other parameters measured further downstream from portion 16 of exhaust system 12 where after-treatment component 18 would normally be disposed.

Controller 24 may include any means for receiving machine operating parameter-related information and/or for monitoring, recording, storing, indexing, processing, and/or communicating such information. These means may include components such as, for example, a memory, one or more data storage devices, a central processing unit, or any other components that may be used to run an application.

Controller 24 may be configured to store information on and/or read information from various types of computer program products or computer-readable media, such as computer chips and secondary storage devices, including hard disks, floppy disks, optical media, CD-ROM, or other forms of RAM or ROM. Various other known circuits may be associated with controller 24, such as power supply circuitry, signal-conditioning circuitry, solenoid driver circuitry, communication circuitry, and other appropriate circuitry.

In addition, Controller 24 may be an electronic control unit (ECU) configured to perform multiple processing and controlling functions, such as, for example, engine management (e.g., in some embodiments, controller 24 may include an engine control module, a.k.a. an ECM), monitoring/calculating various parameters related to exhaust output and after-treatment thereof, etc. In some embodiments, machine 26 may include multiple controllers (a configuration not shown), each dedicated to perform one or more of these or other functions. Such multiple controllers may be configured to communicate with one another.

Controller 24 may be configured to receive signals indicative of upstream temperature measurements from upstream temperature sensor 20 and signals indicative of downstream temperature measurements from downstream temperature sensor 22. Controller 24 may also be configured to determine, from the received signals/measurements, upstream rates of temperature change and downstream rates of temperature change. In some embodiments, controller 24 may be configured to compare the upstream rates of temperature change to the downstream rates of temperature change and generate a fault if the upstream rates of temperature change and the downstream rates of temperature change at a given time differ by less than a predetermined amount. Alternatively or additionally, controller 24 may be configured to integrate the upstream absolute rates of temperature change over a period of time and integrate the downstream absolute rates of temperature change over substantially the same period of time. In such embodiments, controller 24 may be configured to compare the integrated upstream rates of temperature change with the integrated downstream rates of temperature change and generate a fault if the integrated upstream rates of temperature change and the integrated downstream rates of temperature change differ by less than a predetermined amount.

As discussed in greater detail below, generating a fault may be further conditional upon the rate of upstream temperature change being non-zero. In some embodiments, generating a fault may be conditional upon the absolute rate of upstream temperature change being above a predetermined threshold.

Alternatively or additionally, generating a fault may also be conditional upon the difference between the upstream temperature and the downstream temperature being non-zero. In some embodiments, generating a fault may be conditional upon the absolute difference between the upstream temperature and the downstream temperature being above a predetermined threshold.

In some embodiments, after-treatment component detection system 10 may be a particulate trap detection system. In such a particulate trap detection system, controller 24 may be configured to compare the upstream temperature measurements to the downstream temperature measurements. Controller 24 may also be configured to generate a fault if an upstream temperature measurement, taken at a time when the upstream temperature measurements are changing (increasing or decreasing) at a rate faster than a predetermined rate, exceeds a corresponding downstream temperature measurement taken at substantially the same time and the difference between the upstream temperature and the corresponding downstream temperature is less than a predetermined amount.

For purposes of this disclosure, generating a fault may encompass any of a number of actions in response to a threshold being exceeded. For example, in some embodiments, generating a fault may include simply generating and storing data indicative of the fault-triggering event. In other embodiments, generating a fault may include or trigger further events, such as displaying and/or sounding a warning or alert. In some embodiments, generating a fault may include or trigger the making of changes to operating conditions of engine 14 and/or detection system 10. For example, controller 24 may be configured to shut down engine 14 if a fault is generated indicating that a catalyst may be missing from exhaust system 12.

In addition, predetermined values to which monitored parameters are compared may be pre-stored values or may be values determined during development of engine 14, exhaust system 12, and/or detection system 10. In some embodiments, the disclosed predetermined values may be determined just prior to the comparison. For example, the predetermined values may be thresholds determined based on real-time data collected during operation of engine 14. Accordingly, the predetermined values (i.e., thresholds) may vary depending on the operating conditions of engine 14 and exhaust system 12.

Industrial Applicability

The disclosed after-treatment component detection system is configured for detecting whether an after-treatment component, such as a catalyst (e.g., an oxidation catalyst or a reduction catalyst, such as an SCR catalyst) or particulate trap, has been at least partially removed from an exhaust system or has otherwise been tampered with. The disclosed detection system and the methods of use discussed below may be applicable to any exhaust producing engine for which it is desirable to reduce the amount of certain exhaust constituents (e.g., $NO_x$, particulate matter, etc.) produced thereby.

In some embodiments (not shown), portion 16 of exhaust system 12 may be configured to include a plurality of after-treatment components. For example, two or more catalyst-based devices (or a diverse combination of after-treatment components, such as a catalyst-based device and a particulate filter) may be disposed within portion 16 in series. In such embodiments, detection system 10 may be configured to detect whether any of the after-treatment components are missing from portion 16. For example, temperature sensors may be disposed upstream and downstream of the two or more after-treatment components and, in some embodiments, between after-treatment components. In such embodiments, controller 24 may be configured to determine from temperature measurments taken upstream, downstream, and, in some embodiments, within portion 16, whether a predetermined thermal mass resides within portion 16. From such a determination, controller 24 may determine whether any of the after-treatment components are missing from portion 16.

Figure 2:
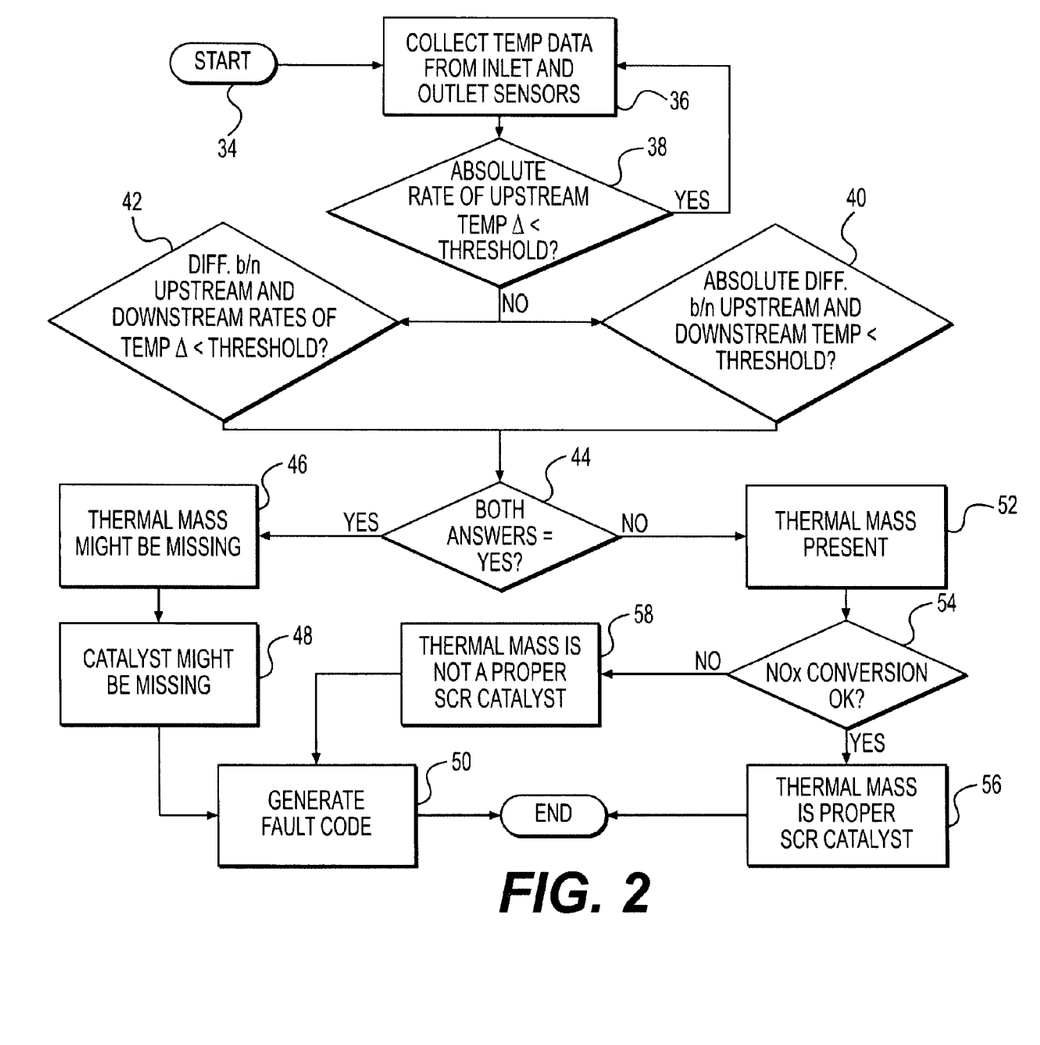
FIG. 2 is a flow chart illustrating a first exemplary method of detecting the presence of an after-treatment component.
Figure 3:
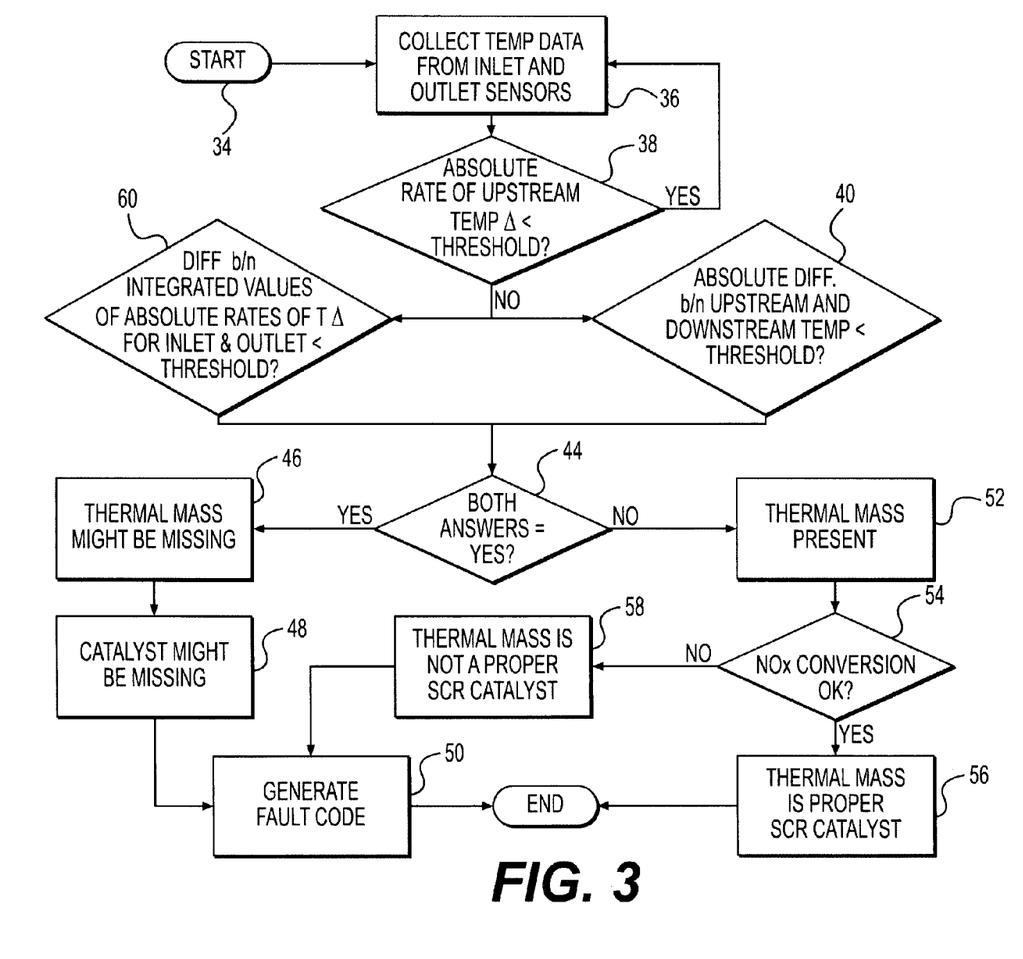
FIG. 3 is a flow chart illustrating a second exemplary method of detecting the presence of an after-treatment component.

Two different methods are proposed for analyzing temperature data received from upstream temperature sensor 20 and downstream temperature sensor 22. FIGS. 2 and 3 correspond, respectively, to the two methods discussed below.

Both methods are based on the effect of the thermal inertia of the mass (a.k.a., the "thermal mass") of an after-treatment component (e.g., an SCR catalyst or particulate trap) on exhaust temperatures. These methods compare the inlet (upstream) temperature measurements with the outlet (downstream) temperature measurements to determine whether there is a thermal mass (i.e., a catalyst or particulate trap) between the temperature sensors. If there is a thermal mass between the sensors, and the incoming exhaust temperature is changing, then there should be a delay between the time when the upstream temperature sensor detects an exhaust temperature change and the time when the downstream temperature sensor detects the temperature change. The delay occurs because the after-treatment component mass takes some time to heat up. That is, because the downstream temperature typically corresponds with the temperature of the after-treatment component, the downstream temperature will remain lower than the upstream temperature during, and after, an increase in upstream temperature until the after-treatment component temperature catches up with the incoming exhaust temperature.

Due to this delay effect, the rate of temperature change upstream from the after-treatment component at a given time will be greater than the rate of temperature change downstream from the after-treatment component under most conditions where upstream temperature is transient. The first method discussed below and shown in FIG. 2, is based on this principle.

In addition, for any given oscillation of exhaust temperature, once the upstream temperature peaks it then goes back down immediately or after a short time. Therefore, there is usually not enough time for the downstream temperature to fully catch up with the upstream temperature. Consequently, when the upstream temperature is transient, the sum of measured upstream temperatures over a given time period is usually larger than the sum of measured downstream temperatures over substantially the same time period. The second method, which is discussed below and shown in FIG. 3, is based on this principle.

FIG. 2 is a flowchart illustrating a first exemplary method of detecting the presence of an exhaust after-treatment component. The method may commence at step 34 ("START") and may proceed with receiving upstream temperature measurements and downstream temperature measurements with a controller. (Step 36.) The measurements may be taken in an exhaust system configured to carry exhaust gases produced by a combustion engine, wherein the upstream temperature measurements are taken at a location upstream from a portion of the exhaust system configured to include an after-treatment component, and the downstream temperature measurements are taken at a location downstream from the portion of the exhaust system configured to include the after-treatment component.

As discussed in more detail below, this first method may involve determining whether an absolute difference between the rate of change of the upstream temperature and the rate of change of the downstream temperature is below a predetermined threshold (i.e., whether the downstream temperature is changing more slowly than the upstream temperature). However, the behavior of the downstream temperature does not differ from that of the upstream temperature unless the exhaust temperature is transient. That is, even with an after-treatment component in place, if exhaust temperature is constant (e.g., while driving at a steady speed on a flat road), there will be no difference in the rates of change of the upstream temperature and downstream temperature (i.e., both rates of change would be zero). Therefore, if inlet exhaust temperature is constant, it would not be expected, even with a proper after-treatment component in place, that the rates of temperature change upstream and downstream from the after-treatment component would differ because both rates of change would equal zero (and thus be equal to each other). This situation (i.e., constant exhaust temperature) would create a false fault reading if there were no additional conditions, other than differing rates of temperature change, for triggering a fault code. Therefore, the method of detecting the presence of an after-treatment component may include determining whether the upstream temperature is changing. Accordingly, at step 38, the method may include determining whether the absolute rate of upstream temperature change is below a predetermined threshold.

In addition, another situation may lead to a false fault code. As an after-treatment component heats up, although the rate of change of the upstream temperature will initially be higher than that of the downstream temperature, after some time, the rate of change of the downstream temperature may catch up to that of the upstream temperature. In other words, even though the upstream temperature is changing, the rates of change for the upstream and downstream temperatures may become the same, and thus, below the predetermined threshold difference between the rates of temperature change, which could trigger a fault code. To prevent such a false fault code, the method may include determining whether the absolute difference between the upstream temperature and the downstream temperature is below a predetermined threshold value. (Step 40.)

The method may then continue to step 42, which includes determining whether an absolute difference between the rate of upstream temperature change and the rate of downstream temperature change is below a predetermined threshold. An absolute difference between the rates of change that is below a predetermined threshold may indicate that there is no thermal mass between the sensors. Therefore, if the absolute difference between the rates of change is less than the predetermined threshold value, and if the absolute difference between the upstream and downstream temperatures is less than the predetermined threshold value (step 44, i.e., the answers to the queries in steps 40 and 42 are both "yes"), it may be concluded that the proper thermal mass is not present between the sensors. (Step 46.) Once it is determined that the proper thermal mass is missing, it may also be concluded, at step 48, that the after-treatment component (e.g., a catalyst) is missing. The method may further include generating a fault (step 50) if the upstream rate of temperature change and the downstream rate of temperature change differ by less than a predetermined amount or, more specifically, if it is ultimately concluded (e.g., upon taking other factors into consideration that the after-treatment component (e.g., the catalyst) is missing.

Therefore, not only is the generation of a fault conditional upon the absolute difference between the rate of upstream temperature change and the rate of downstream temperature change being below a predetermined threshold, but the generation of a fault may also be conditional upon the rate of upstream temperature change being non-zero (or above a predetermined threshold), i.e., to ensure that exhaust temperature is transient. In addition, in some embodiments, generation of a fault may be further conditional upon the difference between the upstream temperature and the downstream temperature being non-zero.

In some embodiments, these additional conditions evaluated in steps 38 and 40 may be substituted for, or supplemented with, other conditions that may ensure against false fault codes in much the same way. For example, step 38, which checks whether exhaust temperature is transient, may be replaced by control strategy that, for example, only runs the diagnostic check during conditions known to generate a transient exhaust temperature. For instance, the control system may only run this diagnostic check for a thermal mass for a short period of time after a cold start of the engine, which will always produce a transient exhaust temperature as the engine comes up to operating temperature.

In some embodiments, other monitored operating parameters may be monitored as additional conditions to determining a fault code. For example, controller 24 may be configured to detect fluctuations in fuel delivery and/or loads on engine 14. Such fluctuations may be indicative of a missing after-treatment component and thus may be used as additional trigger conditions which may be met in order for a fault to be recorded. In some cases, this kind of additional monitoring of additional parameters may facilitate detection of missing after-treatment components from exhaust systems associated with engines intended to be run in a relatively steady state fashion. For example, one application for such additional monitoring may include systems such as electric power generation sets, wherein an electric generator is driven by a combustion engine, which may be run for long periods at a substantially constant speed and load.

If either of the inquiries in steps 40 and 42 returns a negative result, then it may be concluded (e.g., by the system) that the correct amount of thermal mass has been detected between the upstream and downstream temperature sensors (step 52). To ensure that the detected thermal mass is, for example, a proper SCR catalyst for the given power system, an additional check may be made to determine whether the $NO_x$ conversion, which is supposed to be performed by the SCR catalyst, is satisfactory. (Step 54.) If the $NO_x$ conversion is within an acceptable range, the system may conclude that the thermal mass is proper for the given system, e.g., a proper SCR catalyst. (Step 56.)

If the NOx conversion is determined to be outside the acceptable range, for example, below a predetermined threshold, the system may conclude that the thermal mass is not proper for the given system, e.g., not a proper SCR catalyst. (Step 58.) In response, the system may generate a fault code (step 50), which may or may not be the same fault code triggered if no proper thermal mass is detected to be present.

A second method of detecting the presence of an exhaust after-treatment component may involve monitoring another characteristic of temperature behavior that is caused by the delay in the downstream temperature change as compared to the upstream temperature change. Because of this delay that occurs when a thermal mass is present, not only does the upstream temperature change faster than the downstream temperature, but also, the upstream temperature changes more frequently, and to a greater extent, than does the downstream temperature. To evaluate this characteristic, the system may integrate both the upstream absolute rates of temperature change and the downstream absolute rates of temperature change over time. The system may then compare the integrated upstream values to the integrated downstream values. The values produced by integrating the upstream rates of temperature change should be distinctly larger than the values produced by integrating downstream rates of temperature change when a thermal mass is present. A difference between the integrated upstream and downstream rates of temperature change that is below a predetermined threshold may indicate that there is no thermal mass present.

FIG. 3 is a flow diagram illustrating this second method of detecting the presence of an exhaust after-treatment component. The only difference from the method illustrated in FIG. 2 is that instead of step 42 where the rates of temperature change are compared in the method illustrated in FIG. 2, this second method illustrated in FIG. 3 includes step 60, which includes comparing the integrated values of the absolute rates of temperature change for the inlet (upstream) and outlet (downstream) of after-treatment component 18, over substantially the same period of time, and determining whether the difference between the integrated inlet and outlet values is less than a predetermined threshold.

The first and second methods are discussed and illustrated herein as individual methods. However, in some embodiments, the first and second methods may be utilized together to provide an even more accurate assessment of whether there is a proper thermal mass present.

It will be apparent to those having ordinary skill in the art that various modifications and variations can be made to the disclosed after-treatment component detection system without departing from the scope of the disclosed embodiments. Other embodiments of the disclosed system will be apparent to those having ordinary skill in the art from consideration of the specification and practice of the concepts disclosed herein. It is intended that the specification and examples be considered as exemplary only, with a true scope of the disclosed system being indicated by the following claims and their equivalents.

What is claimed is:

1. An after-treatment component detection system, comprising:
    an exhaust system configured to carry exhaust gases produced by a combustion engine away from the engine and configured to include an after-treatment component configured to remove one or more constituents of the exhaust gases;
    an upstream temperature sensor configured to measure temperature upstream from the after-treatment component;

a downstream temperature sensor configured to measure temperature downstream from the after-treatment component; and
a controller configured to:
receive signals indicative of upstream temperature measurements from the upstream temperature sensor and signals indicative of downstream temperature measurements from the downstream temperature sensor;
determine, from the received signals, an upstream rate of temperature change and a downstream rate of temperature change;
determine, from the received signals, an absolute difference between the upstream temperature and the downstream temperature;
compare the upstream rate of temperature change to the downstream rate of temperature change; and
generate a fault if the upstream rate of temperature change and the downstream rate of temperature change differ by less than a predetermined amount, and the absolute difference between the upstream temperature and the downstream temperature is below a threshold value.

2. The system of claim 1, wherein generating a fault is conditional upon an absolute rate of upstream temperature change being above a predetermined threshold.

3. The system of claim 1, wherein generating a fault is conditional upon a difference between the upstream temperature and the downstream temperature being non-zero.

4. The system of claim 1, wherein the after-treatment component is a catalyst-based device.

5. The system of claim 1, wherein the after-treatment component includes a particulate trap.

6. An after-treatment component detection system, comprising:
an exhaust system configured to carry exhaust gases produced by a combustion engine away from the engine and configured to include an after-treatment component configured to remove one or more constituents of the exhaust gases;
an upstream temperature sensor configured to measure temperature upstream from the after-treatment component;
a downstream temperature sensor configured to measure temperature downstream from the after-treatment component; and
a controller configured to:
receive signals indicative of upstream temperature measurements from the upstream temperature sensor and signals indicative of downstream temperature measurements from the downstream temperature sensor;
determine, from the received signals, absolute rates of upstream temperature change and absolute rates of downstream temperature change;
determine, from the received signals, an absolute difference between the upstream temperature and the downstream temperature;
integrate the upstream absolute rates of temperature change over a period of time;
integrate the downstream absolute rates of temperature change over substantially the same period of time;
compare the integrated upstream rates of temperature change with the integrated downstream rates of temperature change; and
generate a fault if the integrated upstream rates of temperature change and the integrated downstream rates of temperature change differ by less than a predetermined amount, and the absolute difference between the upstream temperature and the downstream temperature is below a threshold value.

7. The system of claim 6, wherein generating a fault is conditional upon the absolute rate of upstream temperature change being above a predetermined threshold.

8. The system of claim 6, wherein generating a fault is conditional upon the absolute difference between the upstream temperature and the downstream temperature being non-zero.

9. The system of claim 6, wherein the after-treatment component is a catalyst-based device.

10. The system of claim 6, wherein the after-treatment component includes a particulate trap.

11. A particulate trap detection system, comprising:
an exhaust system configured to carry exhaust gases produced by a combustion engine away from the engine and configured to include a particulate trap configured to remove particulate matter from the exhaust gases;
an upstream temperature sensor configured to measure temperature upstream from the particulate trap;
a downstream temperature sensor configured to measure temperature downstream from the after-treatment component; and
a controller configured to:
receive signals indicative of upstream temperature measurements from the upstream temperature sensor and signals indicative of downstream temperature measurements from the downstream temperature sensor;
compare the upstream temperature measurements to the downstream temperature measurements; and
generate a fault if:
an upstream temperature measurement, taken at a time when the upstream temperature measurements are increasing at a rate faster than a predetermined rate, exceeds a corresponding downstream temperature measurement taken at substantially the same time; and
a difference between the upstream temperature and the corresponding downstream temperature is less than a predetermined amount.

12. A method of detecting the presence of an exhaust after-treatment component, comprising:
taking upstream temperature measurements in an exhaust system configured to carry exhaust gases produced by a combustion engine, the upstream temperature measurements being taken at a first location upstream from a portion of the exhaust system configured to include an after-treatment component;
taking downstream temperature measurements at a second location downstream from the portion of the exhaust system configured to include the after-treatment component;
receiving signals indicative of the upstream temperature measurements with a controller; receiving signals indicative of the downstream temperature measurements with the controller;
determining, from the received signals, an upstream rate of temperature change and a downstream rate of temperature change;
determining, from the received signals, an absolute difference between the upstream temperature and the downstream temperature;
comparing the upstream rate of temperature change to the downstream rate of temperature change; and
generating a fault if the upstream rate of temperature change and the downstream rate of temperature change differ by less than a predetermined amount, and the absolute difference between the upstream temperature and the downstream temperature is below a threshold value.

13. The method of claim 12, wherein generating a fault is conditional upon an absolute rate of upstream temperature change being above a predetermined threshold.

14. The method of claim 12, wherein generating a fault is conditional upon the absolute difference between the upstream temperature and the downstream temperature being non-zero.

15. The method of claim 12, wherein the after-treatment component is a catalyst-based device.

16. The method of claim 12, wherein the after-treatment component includes a particulate trap.

17. A method of detecting the presence of an exhaust after-treatment component, comprising:
   taking upstream temperature measurements in an exhaust system configured to carry exhaust gases produced by a combustion engine, the upstream temperature measurements being taken at a first location upstream from a portion of the exhaust system configured to include an after-treatment component;
   taking downstream temperature measurements at a second location downstream from the portion of the exhaust system configured to include the after-treatment component;
   receiving signals indicative of the upstream temperature measurements with a controller;
   receiving signals indicative of the downstream temperature measurements with the controller;
   determining absolute upstream rates of temperature change and downstream rates of temperature change;
   determining an absolute difference between the upstream temperature and the downstream temperature
   integrating the upstream rates of temperature change over a period of time;
   integrating the downstream rates of temperature change over substantially the same period of time;
   comparing the integrated upstream rates of temperature change with the integrated downstream rates of temperature change; and
   generating a fault if the integrated upstream rates of temperature change and the integrated downstream rates of temperature change differ by less than a predetermined amount, and the absolute difference between the upstream temperature and the downstream temperature is below a threshold value.

18. The method of claim 17, wherein generating a fault is conditional upon the absolute rate of upstream temperature change being above a predetermined threshold.

19. The method of claim 17, wherein generating a fault is conditional upon the absolute difference between the upstream temperature and the downstream temperature being non-zero.

20. The method of claim 17, wherein the after-treatment component is a catalyst-based device.

21. The method of claim 17, wherein the after-treatment component includes a particulate trap.

22. A method of detecting the presence of a particulate trap, comprising: taking upstream temperature measurements in an exhaust system configured to carry exhaust gases produced by a combustion engine, the upstream temperature measurements being taken at a first location upstream from a portion of the exhaust system configured to include a particulate trap;
   taking downstream temperature measurements at a second location downstream from the portion of the exhaust system configured to include the particulate trap;
   receiving signals indicative of the upstream temperature measurements with a controller;
   receiving signals indicative of the downstream temperature measurements with the controller;
   comparing the upstream temperature measurements to the downstream temperature measurements; and
   generating a fault if:
      an upstream temperature measurement, taken at a time when the upstream temperature measurements are increasing at a rate faster than a predetermined rate, exceeds a corresponding downstream temperature measurement taken at substantially the same time; and
      a difference between the upstream temperature and the corresponding downstream temperature is less than a predetermined amount.

23. The method of claim 22, wherein the method is executed during engine warmup from a cold start.

24. The method of claim 22, wherein generating the fault is conditional on the difference between the upstream temperature and the corresponding downstream temperature being non-zero.

* * * * *